United States Patent
Reed et al.

(10) Patent No.: US 9,327,706 B2
(45) Date of Patent: May 3, 2016

(54) SYSTEMS AND METHODS FOR IMPROVING ENGINE STARTING

(71) Applicant: Ford Global Technologies, LLC, Dearborn, MI (US)

(72) Inventors: Dennis Craig Reed, Dexter, MI (US); Jeffrey Allen Doering, Canton, MI (US); David Oshinsky, Trenton, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 14/172,337

(22) Filed: Feb. 4, 2014

(65) Prior Publication Data

US 2015/0217751 A1    Aug. 6, 2015

(51) Int. Cl.
| | |
|---|---|
| F02N 11/04 | (2006.01) |
| F02N 11/08 | (2006.01) |
| B60W 10/02 | (2006.01) |
| B60W 10/06 | (2006.01) |
| F02D 29/02 | (2006.01) |
| B60K 6/48 | (2007.10) |
| B60W 20/00 | (2016.01) |

(52) U.S. Cl.
CPC .......... *B60W 10/06* (2013.01); *B60K 6/48* (2013.01); *B60W 10/02* (2013.01); *B60W 20/40* (2013.01); *F02D 29/02* (2013.01); *B60Y 2300/48* (2013.01); *B60Y 2300/64* (2013.01); *Y02T 10/6221* (2013.01)

(58) Field of Classification Search
CPC .............................. F02N 11/04; F02N 11/0822
USPC ........................................................... 701/67
See application file for complete search history.

(56) References Cited

U.S. PATENT DOCUMENTS

| | | | |
|---|---|---|---|
| 5,887,670 A | 3/1999 | Tabata et al. | |
| 6,396,165 B1 * | 5/2002 | Nagano .................... | B60K 6/42 290/40 R |
| 6,923,159 B2 * | 8/2005 | Sakumoto ........... | F02D 41/3082 123/179.17 |
| 2002/0096137 A1 * | 7/2002 | Kobayashi ............. | B60K 6/485 123/179.4 |
| 2011/0118078 A1 * | 5/2011 | Kraska ..................... | B60K 6/48 477/5 |
| 2012/0258838 A1 | 10/2012 | Hartz et al. | |
| 2014/0121944 A1 * | 5/2014 | Douglas ................ | F02D 41/064 701/103 |

* cited by examiner

*Primary Examiner* — Jacob S Scott
*Assistant Examiner* — Tinh Dang
(74) *Attorney, Agent, or Firm* — David Kelley; Alleman Hall McCoy Russell & Tuttle LLP (57) ABSTRACT

Systems and methods for improving operation of a hybrid vehicle are presented. In one example, an engine is rotated to increase pressure within a fuel rail. The engine is rotated without combusting air and fuel within the engine.

18 Claims, 5 Drawing Sheets

SYSTEMS AND METHODS FOR IMPROVING ENGINE STARTING

FIELD

The present description relates to systems and methods for improving starting of a hybrid vehicle that includes a driveline disconnect clutch. The system and methods may be particularly useful for a vehicle that includes an engine that is directly injected with fuel.

BACKGROUND AND SUMMARY

A hybrid vehicle driveline may include an engine that is directly injected with fuel and a driveline disconnect clutch. The driveline disconnect clutch may be selectively opened and closed in response to vehicle operating conditions. For example, the driveline disconnect clutch may be opened when battery state of charge (SOC) is high and driver demand torque (e.g., torque requested by a driver) is low. The same driveline disconnect clutch may be closed when driver demand torque is greater than a threshold torque or when battery SOC is less than a threshold SOC. The driveline disconnect clutch may also be closed to start the engine via an electric machine in the driveline. However, it may take more time than is desired to get the engine started since the engine is directly injected with fuel.

The inventors herein have recognized the above-mentioned disadvantages and have developed a method of engine starting, comprising: rotating an engine in response to a vehicle activation request and in the absence of an engine start request; not supplying fuel to the rotating engine; stopping the rotating engine; and starting the stopped engine in response to an engine start request.

By rotating an engine to increase fuel pressure of a direct injection fuel rail before an engine start request, it may be possible to provide the technical result of starting the engine in less time since fuel pressure may already be at a level that supports fuel injection into engine cylinders. For example, an engine may be rotated without supplying spark and fuel to the engine so that a direct injection fuel pump within the engine increases pressure within a direct injection fuel rail. If a request to start the engine occurs a short time after a desired pressure in the direct injection fuel rail is established, fuel may be injected without having to rotate the engine to reestablish the desired fuel pressure. Thus, it may be possible to rotate the engine less during engine starting, thereby reducing engine starting time.

The present description may provide several advantages. In particular, the approach may reduce engine starting time. Further, the approach may improve vehicle drivability and engine emissions. Further still, the approach may improve driver satisfaction regarding the vehicle driving experience.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
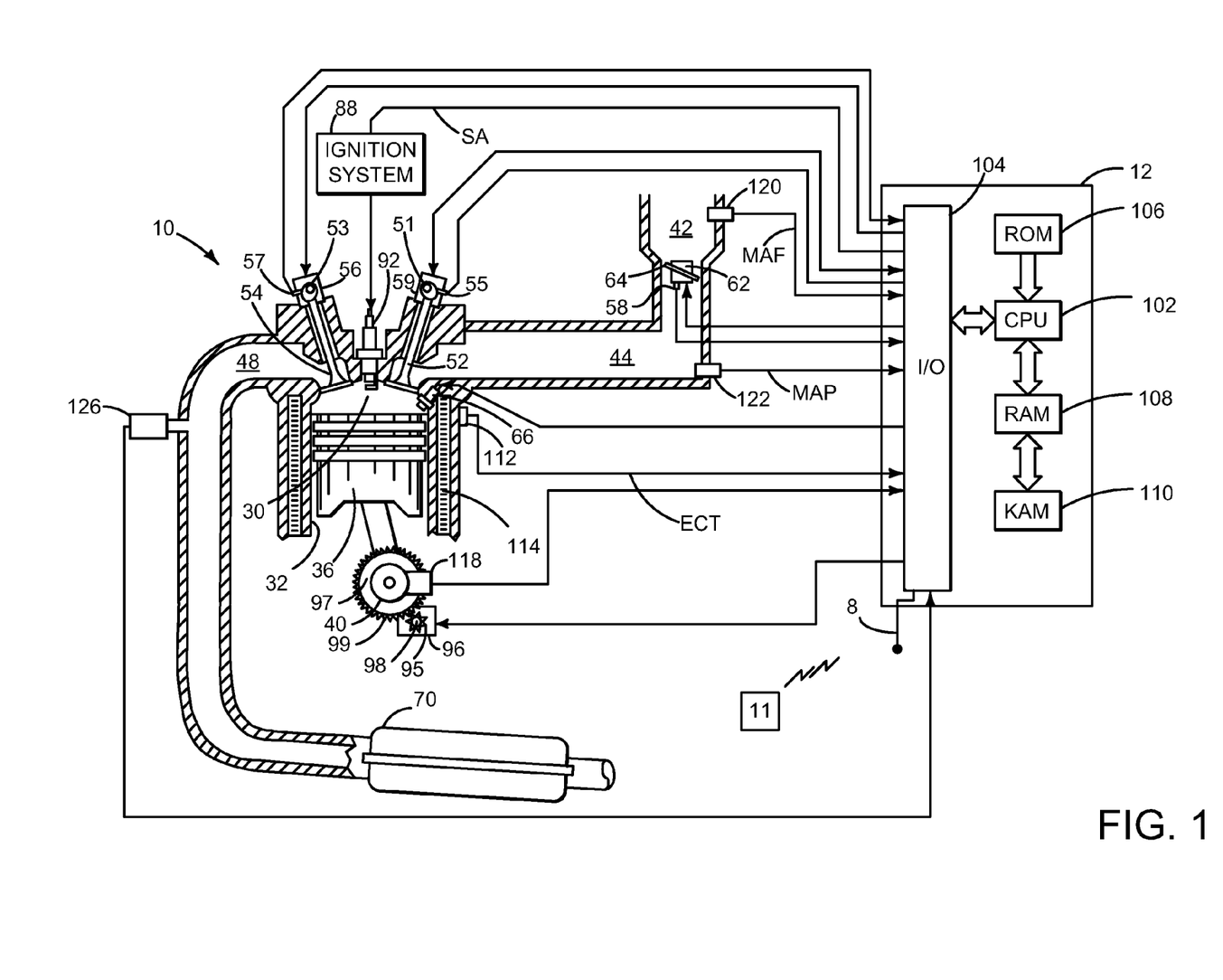
FIG. 1 is a schematic diagram of an engine.
Figure 2:
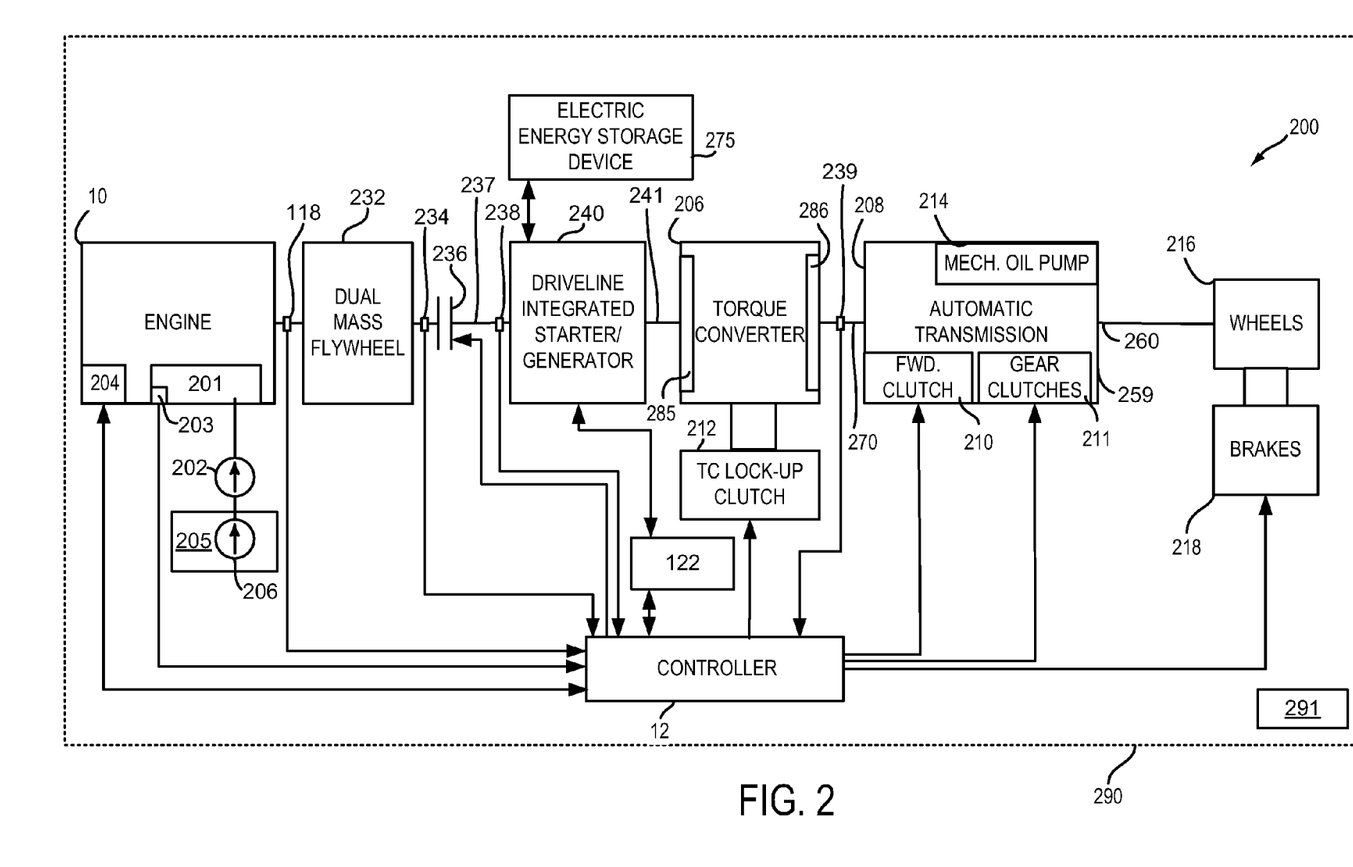
FIG. 2 shows an example vehicle driveline configuration.
Figure 3:
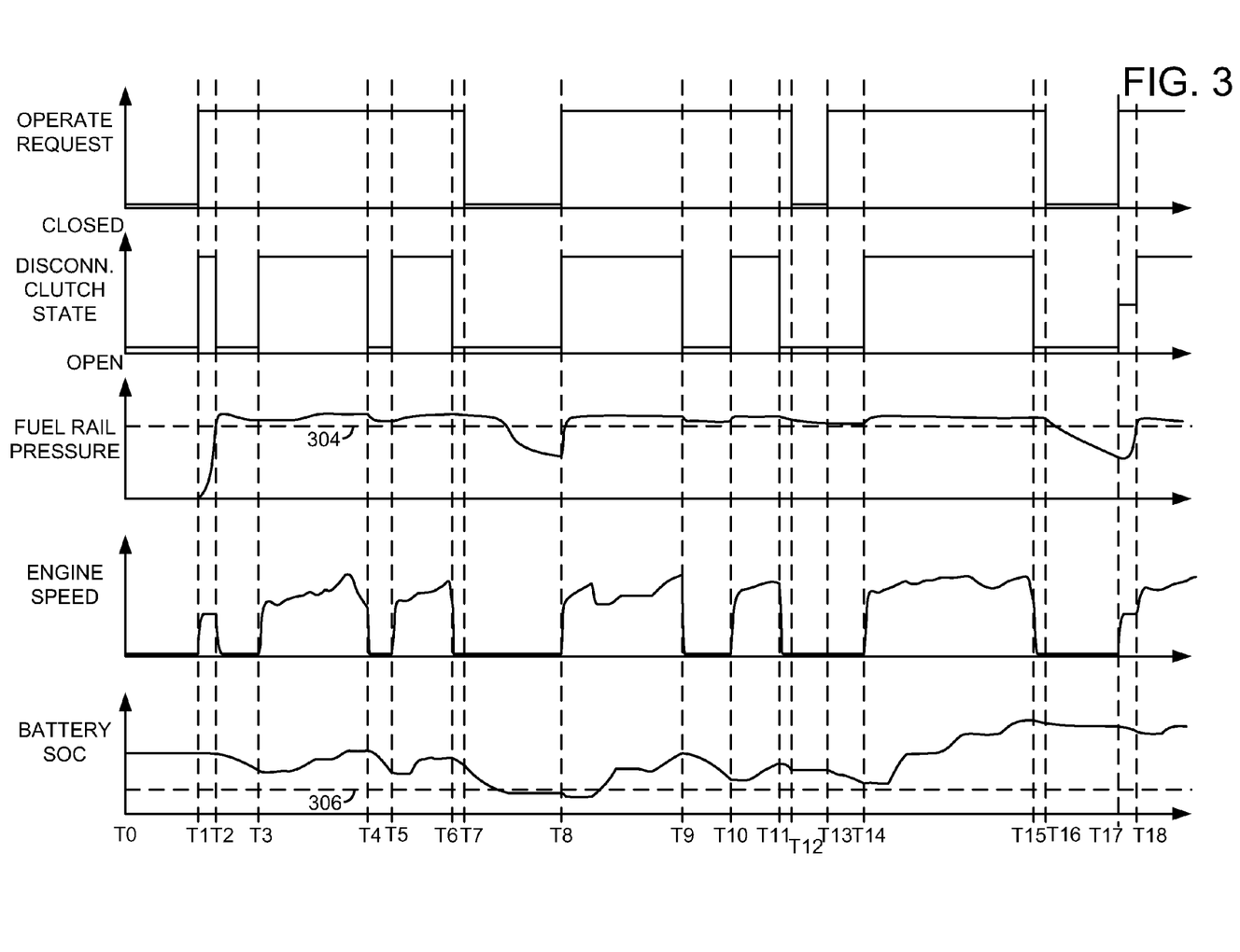
FIG. 3 shows an example vehicle operating sequence that includes engine starting.

The present description is related to starting an engine of a hybrid vehicle. The vehicle may include an engine as is shown in FIG. 1. The engine may be mechanically coupled to other vehicle components including a motor to form a driveline as is shown in FIG. 2. The engine and the motor may be selectively coupled and decoupled to change driveline operating modes. The engine and driveline may operate as shown in FIG. 3 according to the method of FIGS. 4 and 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Timing of exhaust cam 53 may be varied with respect to timing of crankshaft 40 using exhaust cam phase adjuster 56 so as to adjust exhaust valve opening and closing positions relative to crankshaft position. Timing of intake cam 51 may be varied with respect to timing of crankshaft 40 using exhaust cam phase adjuster 59 so as to adjust exhaust valve opening and closing positions relative to crankshaft position.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width of a signal from controller 12. Fuel is delivered to fuel injector 66 by a fuel system (e.g. shown in FIG. 2) including a fuel tank, fuel pump, and fuel rail. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also include an antenna 8 for receiving input from transmitter 11. Transmitter 11 may notify controller that a driver is in proximity to the vehicle or the passenger cabin 291 shown in FIG. 2.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. The vehicle 290 may include a passenger cabin 291 for transporting passengers.

Engine 10 may be started with an engine starting system shown in FIG. 1 or via driveline integrated starter/generator (DISG) or electric machine (e.g. motor) 240. Further, engine 10 may generate or adjust torque via torque actuator 204, such as a fuel injector, throttle, cam, ignition coil, etc. Fuel rail 201 may be supplied fuel by mechanical fuel pump 202 which may be included in and driven by engine 10. In one example, mechanical fuel pump 202 may be driven by a camshaft or crankshaft of engine 10. Fuel may be supplied to mechanical fuel pump 202 from fuel tank 205 via electric fuel pump 206. Electric fuel pump 206 may output a lower fuel pressure than mechanical fuel pump 202. Pressure of fuel rail 201 may be reported to controller 12 via pressure sensor 203.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. DISG 240 is controlled via motor controller 122.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to automatic transmission 208 to be adjusted. Controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 via a starter or the DISG and resuming cylinder combustion.

Thus, the method of FIG. 3 provides a system for engine starting, comprising: an engine including an engine driven fuel pump; a driveline integrated starter/generator (DISG); a disconnect clutch mechanically coupled to the engine and the DISG; and a controller including non-transitory instructions for rotating the engine for a predetermined number of compression strokes of the engine driven fuel pump in response to a fuel rail pressure being less than a threshold pressure. The system includes where the DISG rotates the engine. The system also includes where the disconnect clutch is partially closed while the DISG rotates the engine. The system includes where the engine is rotated between engine stops without supplying fuel to the engine. The system includes where the controller includes additional instructions for starting the engine in response to a driver demand torque exceeding a threshold torque. The system includes where engine is rotated in absence of an engine start request.

Referring now to FIG. 3, an example simulated vehicle operating sequence is shown. The operating sequence of FIG. 3 may be provided by the system of FIGS. 1 and 2 according to the method of FIGS. 4 and 5. Vertical markers T0-T18 show timings of particular events during the operating sequence.

The first plot from the top of FIG. 3 is a plot of operate request or vehicle activation state versus time. The operate request indicates a driver's intent to operate or not operate the vehicle. Alternatively, a controller may activate or deactivate the operate request in response to operating conditions. The vehicle's engine and DISG may be activated and deactivated according to vehicle operating conditions after the driver operate request is provided. In one example, the operate request may be asserted in response to a driver activating a key switch, push button, or entering the proximity of the vehicle or the vehicle's occupant cabin. The X axis represents time and time increases from the left side of FIG. 3 to the right side of FIG. 3. The Y axis represents the operate request and the operate request is asserted when the driver operate signal is near a level of the Y axis arrow. The operate request is not asserted when the operate signal is near a level of the X axis.

The second plot from the top of FIG. 3 is a plot of disconnect clutch state versus time. The driveline disconnect clutch 236 may be positioned in the driveline 200 as shown in FIG. 2. The X axis represents time and time increases from the left side of FIG. 3 to the right side of FIG. 3. The Y axis represents the disconnect clutch state and the disconnect clutch is closed when the disconnect clutch state signal is near a level of the Y axis arrow. The disconnect clutch is open when the disconnect clutch state signal is near a level of the X axis. The disconnect clutch is partially closed when the disconnect clutch state signal is between the level of the X axis and the level of the Y axis arrow (e.g., between time T1 and time T2.

The third plot from the top of FIG. 3 is a plot of fuel rail pressure versus time. The X axis represents time and time increases from the left side of FIG. 3 to the right side of FIG. 3. The Y axis represents fuel rail pressure and fuel rail pressure increases in the direction of the Y axis arrow. Horizontal line 304 represents a threshold pressure for injecting fuel to an engine during starting. In one example, the threshold pressure may be 100 bar or a value greater than peak cylinder pressure during engine cranking. The threshold pressure may decrease as the vehicle's altitude increases from sea level.

The fourth plot from the top of FIG. 3 is a plot of engine speed versus time. The X axis represents time and time increases from the left side of FIG. 3 to the right side of FIG.

3. The Y axis represents engine speed and engine speed increases in the direction of the Y axis arrow.

The fifth plot from the top of FIG. 3 is a plot of battery state of charge (SOC) versus time. The X axis represents time and time increases from the left side of FIG. 3 to the right side of FIG. 3. The Y axis represents battery SOC and battery SOC increases in the direction of the Y axis arrow. Horizontal line 306 represents a threshold battery SOC.

At time T0, the operate request is at a low level to signal the Driver's intent to not operate the vehicle. The driveline disconnect clutch is in an open state and fuel rail pressure is at a low level. The fuel rail pressure may reach a low level if the engine has not operated for some time. The engine speed is also at zero to signal that the engine is not operating. The battery SOC is at a middle level.

At time T1, the driver provides intent to operate the vehicle by asserting the operate request. The operate request may be asserted by operating a switch or entering within a predetermined range of the vehicle or the vehicle's passenger cabin. If the driver enters within ranged of the vehicle or the vehicle's passenger cabin, a transmitter on the driver's person may send a signal to controller 12 shown in FIGS. 1 and 2 to prepare the vehicle for operation. A low pressure electric fuel pump (not shown) supplying fuel to an engine driven higher pressure fuel pump (not shown) is also activated in response to the driver operate request. The driveline disconnect clutch fully closes when the transmission is in park or neutral. The DISG (not shown) provides torque to rotate the engine, and if the driver engages the transmission into gear, the DISG propels the vehicle according to the driver demand torque (not shown). The fuel rail pressure begins to increase in response to the driveline disconnect clutch closing. The engine speed increases in response to closing the driveline disconnect clutch since DISG torque is transferred to rotate the engine. The engine is not activated and no spark or fuel is supplied to the engine since it is not desired for the engine to start since the driver demand torque is low (not shown). The battery SOC begins to decrease as the DISG rotates the engine and provides torque to propel the vehicle when the transmission is engaged into a gear.

At time T2, the fuel rail pressure exceeds threshold fuel rail pressure 304. The driveline disconnect clutch is opened in response to fuel rail pressure exceeding the threshold fuel rail pressure 304 and driver demand torque being low (not shown). The engine speed decelerates to zero since the engine is not combusting air and fuel. However, the fuel rail pressure remains at a higher level since a check valve hold pressure in the fuel rail and since fuel is not injected to the engine via the fuel rail. The batter SOC is being reduced, but it remains at a higher level and the operate request remains asserted.

At time T3, the driveline disconnect clutch is closed in response to an increase in the driver demand torque (not shown). Closing the driveline disconnect clutch allows the DISG to rotate the engine so that the engine may be started. Spark and fuel are supplied (not shown) to the engine while the engine rotates by activating the low pressure electrical pump, the mechanical higher pressure pump, and the ignition coils. The engine accelerates as combustion begins in the engine and the engine begins supplying torque to the driveline. The battery SOC begins to increase as the battery is charged via the DISG while the engine is operating. The battery may be charged via the vehicle's kinetic energy or via engine torque. The fuel rail pressure remains at a higher level since the engine is providing torque to operate the mechanical fuel pump.

At time T4, the driveline disconnect clutch is opened in response a low driver demand torque. Additionally, fuel and spark are not delivered to the engine so that the engine stops in response to the low driver demand torque (not shown). The fuel rail pressure remains at an elevated level and the operate request remains asserted. The battery SOC begins to be lowed as the DISG (not shown) is operated on battery power.

At time T5, the driveline disconnect clutch is closed in response to an increase in the driver demand torque (not shown). The engine is restarted by supplying spark and fuel (not shown) to the engine while the engine rotates via torque supplied by the DISG (not shown). The low pressure electrical pump, the mechanical higher pressure pump, and the ignition coils (not shown) are also activated. The engine accelerates as combustion begins in the engine and the engine begins supplying torque to the driveline. The battery SOC begins to increase as the battery is charged via the DISG while the engine is operating. The fuel rail pressure remains at a higher level since the engine is providing torque to operate the mechanical higher pressure fuel pump.

At time T6, the driveline disconnect clutch is opened in response a low driver demand torque. Additionally, fuel and spark are not delivered to the engine so that the engine stops in response to the low driver demand torque (not shown). The fuel rail pressure remains at an elevated level and the operate request remains asserted. The battery SOC begins to be lowed as the DISG (not shown) is operated on battery power.

At time T7, the operate request changes state from asserted to not asserted. The operate request may be not asserted in response to the driver deactivating a switch or leaving the proximity of the vehicle or the vehicle's cabin. The fuel rail pressure remains at a higher level and the engine speed is zero. The battery SOC is at a middle level.

Between time T7 and T8, the fuel rail pressure is reduced and the battery SOC is reduced. The fuel rail pressure may be reduced over time if fuel in the rail slips past fuel rail pressure regulators, check valves, or other fuel system components. The battery SOC may be reduced by maintaining operation of vehicle electrical components such as clocks and lighting.

At time T8, the driver provides intent to operate the vehicle by asserting the operate request. The low pressure electric fuel pump (not shown) supplying fuel to an engine driven higher pressure fuel pump (not shown) is also activated in response to the driver operate request. The driveline disconnect clutch fully closes and the DISG (not shown) provides torque to rotate the engine and propel the vehicle according to the driver demand torque (not shown). However, in some examples, the driveline disconnect clutch may be partially closed during engine starting when the transmission is in gear. The disconnect clutch may be fully closed after the engine is started.

The fuel rail pressure begins to increase in response to the driveline disconnect clutch closing. The engine speed increases in response to closing the driveline disconnect clutch since DISG is transferred to rotate the engine. The engine is activated and spark and fuel are supplied to the engine since battery SOC is less than threshold 306 and since fuel rail pressure is less than threshold pressure 304. The battery SOC begins to decrease as the DISG rotates the engine and provides torque to propel the vehicle.

Between time T8 and T9, the fuel rail pressure is increased and the battery SOC is also increased. The fuel rail pressure is increased by rotating the engine and the higher pressure mechanical fuel pump. The batter SOC may be increased via charging the battery via the engine or the vehicle's kinetic energy.

At time T9, the driveline disconnect clutch is opened in response a low driver demand torque. Additionally, fuel and spark are not delivered to the engine so that the engine stops in response to the low driver demand torque (not shown). The fuel rail pressure remains at an elevated level and the operate request remains asserted. The battery SOC begins to be lowered as the DISG (not shown) is operated on battery power.

At time T10, the driveline disconnect clutch is closed in response to an increase in the driver demand torque (not shown). The engine is restarted by supplying spark and fuel (not shown) to the engine while the engine rotates via torque supplied by the DISG (not shown). The low pressure electrical pump, the mechanical higher pressure pump, and the ignition coils (not shown) are also activated. The engine accelerates as combustion begins in the engine and the engine begins supplying torque to the driveline. The battery SOC begins to increase as the battery is charged via the DISG while the engine is operating. The fuel rail pressure remains at a higher level since the engine is providing torque to operate the mechanical higher pressure fuel pump.

At time T11, the driveline disconnect clutch is opened in response a low driver demand torque. Additionally, fuel and spark are not delivered to the engine so that the engine stops in response to the low driver demand torque (not shown). The fuel rail pressure remains at an elevated level and the operate request remains asserted. The battery SOC begins to be lowered as the DISG (not shown) is operated on battery power.

At time T12, the operate request changes state from asserted to not asserted. The operate request may be not asserted in response to the driver deactivating a switch or leaving the proximity of the vehicle or the vehicle's cabin. The fuel rail pressure remains at a higher level and the engine speed is zero. The battery SOC is at a middle level.

Between time T12 and T13, the fuel rail pressure is reduced, but not to a level less than threshold 304. Likewise, battery SOC is reduced, but not to a level less than threshold 306.

At time T13, the driver provides intent to operate the vehicle by asserting the operate request. The low pressure electric fuel pump (not shown) supplying fuel to an engine driven higher pressure fuel pump (not shown) is not activated in response to the driver operate request since the fuel rail pressure is greater than threshold 304. The driveline disconnect clutch remains open and the DISG (not shown) provides torque to propel the vehicle since the driver demand torque (not shown) is at a lower level and since battery state of charge is greater than threshold 306. The engine remains stopped and battery SOC is reduced as the DISG propels the vehicle.

At time T14, the driveline disconnect clutch is closed in response to an increase in the driver demand torque (not shown). Closing the driveline disconnect clutch causes the DISG to rotate the engine so that the engine may be started. Spark and fuel are supplied (not shown) to the engine while the engine rotates by activating the low pressure electrical pump, the mechanical higher pressure pump, and the ignition coils. The engine accelerates as combustion begins in the engine and the engine begins supplying torque to the driveline. The battery SOC begins to increase after the engine is started as the battery is charged via the DISG. The battery may be charged via the vehicle's kinetic energy or via engine torque. The fuel rail pressure remains at a higher level since the engine is providing torque to operate the mechanical fuel pump.

At time T15, the driveline disconnect clutch is opened in response a low driver demand torque. Additionally, fuel and spark are not delivered to the engine so that the engine stops in response to the low driver demand torque (not shown). The fuel rail pressure remains at an elevated level and the operate request remains asserted. The battery SOC begins to be lowered as the DISG (not shown) is operated on battery power.

At time T16, the operate request changes state from asserted to not asserted. The operate request may be not asserted in response to the driver deactivating a switch or leaving the proximity of the vehicle or the vehicle's cabin. The fuel rail pressure remains at a higher level and the engine speed is zero. The battery SOC is at a middle level.

Between time T16 and T17, the fuel rail pressure is reduced to a level less than threshold 304. The fuel rail pressure may be reduced over time if fuel in the rail slips past fuel rail pressure regulators, check valves, or other fuel system components.

At time T17, the driver provides intent to operate the vehicle by asserting the operate request. The low pressure electric fuel pump (not shown) supplying fuel to an engine driven higher pressure fuel pump (not shown) is activated in response to the driver operate request and in response to the fuel rail pressure being less than threshold 304. The driveline disconnect clutch partially closes and the DISG (not shown) provides torque to propel the vehicle and rotate the engine since the driver demand torque (not shown) is at a lower level and since battery state of charge is greater than threshold 306. Further, the driveline disconnect clutch is partially closed also in response to fuel rail pressure being less than threshold 304. The engine accelerates to a speed less than idle speed using DISG torque. Spark and fuel are not supplied to the engine and the engine is not combusting between time T17 and time T18. The rotating engine causes the higher pressure fuel pump to rotate and increase fuel pressure in the fuel rail. The battery SOC is lowered as the DISG rotates the engine.

At time T18, the driveline disconnect clutch is closed in response to an increase in the driver demand torque (not shown). Closing the driveline disconnect clutch causes the DISG to rotate the engine so that the engine may be started. Spark and fuel are supplied (not shown) to the engine while the engine rotates by activating the low pressure electrical pump, the mechanical higher pressure pump, and the ignition coils. The engine accelerates as combustion begins in the engine and the engine begins supplying torque to the driveline. The battery SOC begins to increase after the engine is started as the battery is charged via the DISG. The fuel rail pressure exceeds threshold 304 as the driver demand torque increases and the DISG rotates the engine.

Thus, as shown in FIG. 3, the driveline disconnect clutch may be closed and opened without starting the engine to increase fuel rail pressure so that engine starting may be improved when driver demand torque causes the controller to activate the engine. However, if the fuel rail pressure is above a threshold pressure, the engine is not rotated so that battery power may be conserved. If fuel rail pressure is less than a threshold pressure and battery SOC is less than a threshold SOC, the driveline disconnect clutch may be closed and the engine may be started as soon as fuel rail pressure exceeds the threshold pressure.

Figure 4:
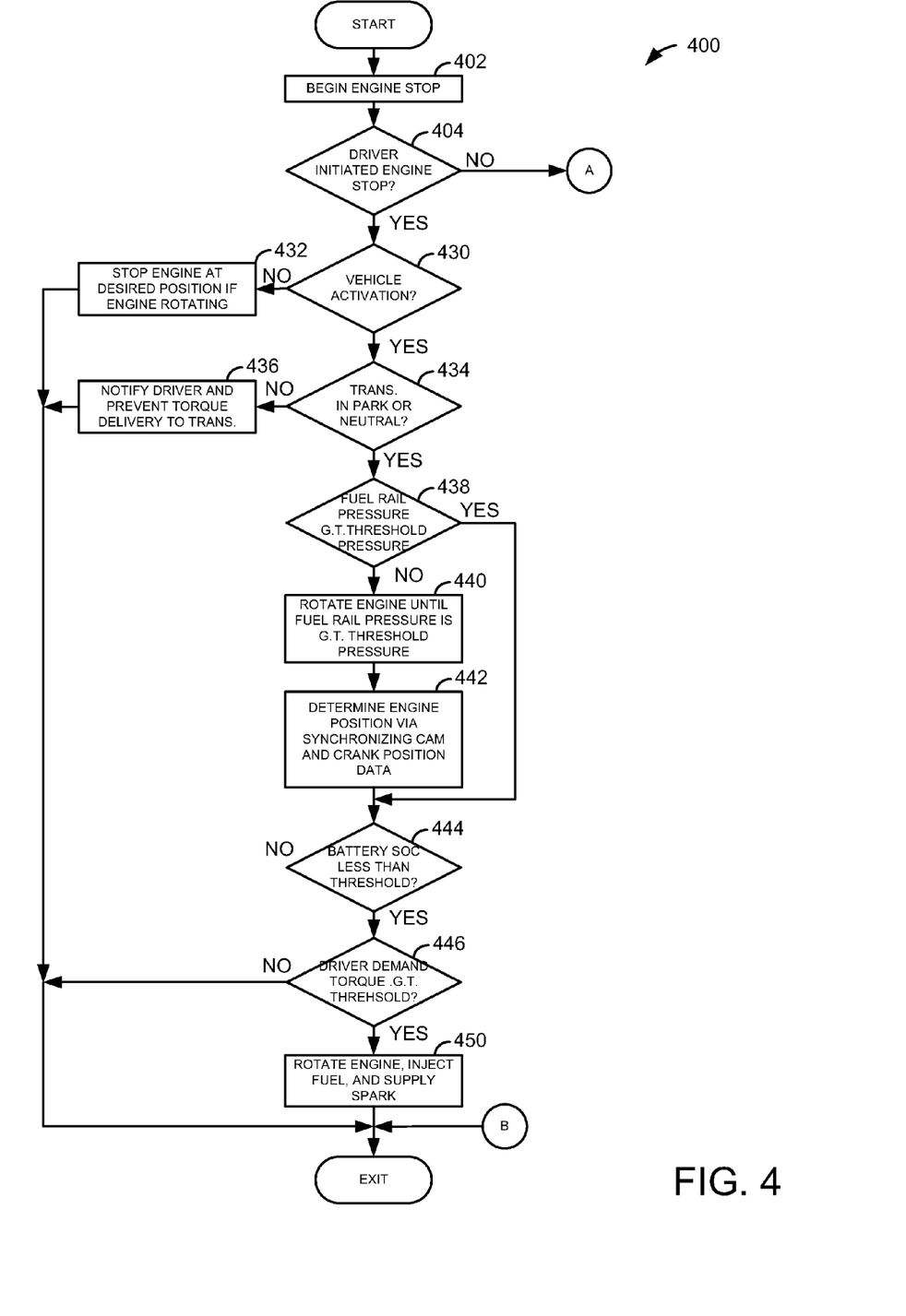
FIGS. 4 and 5 show a flowchart of an example method for starting an engine that includes a driveline disconnect clutch.
Figure 5:
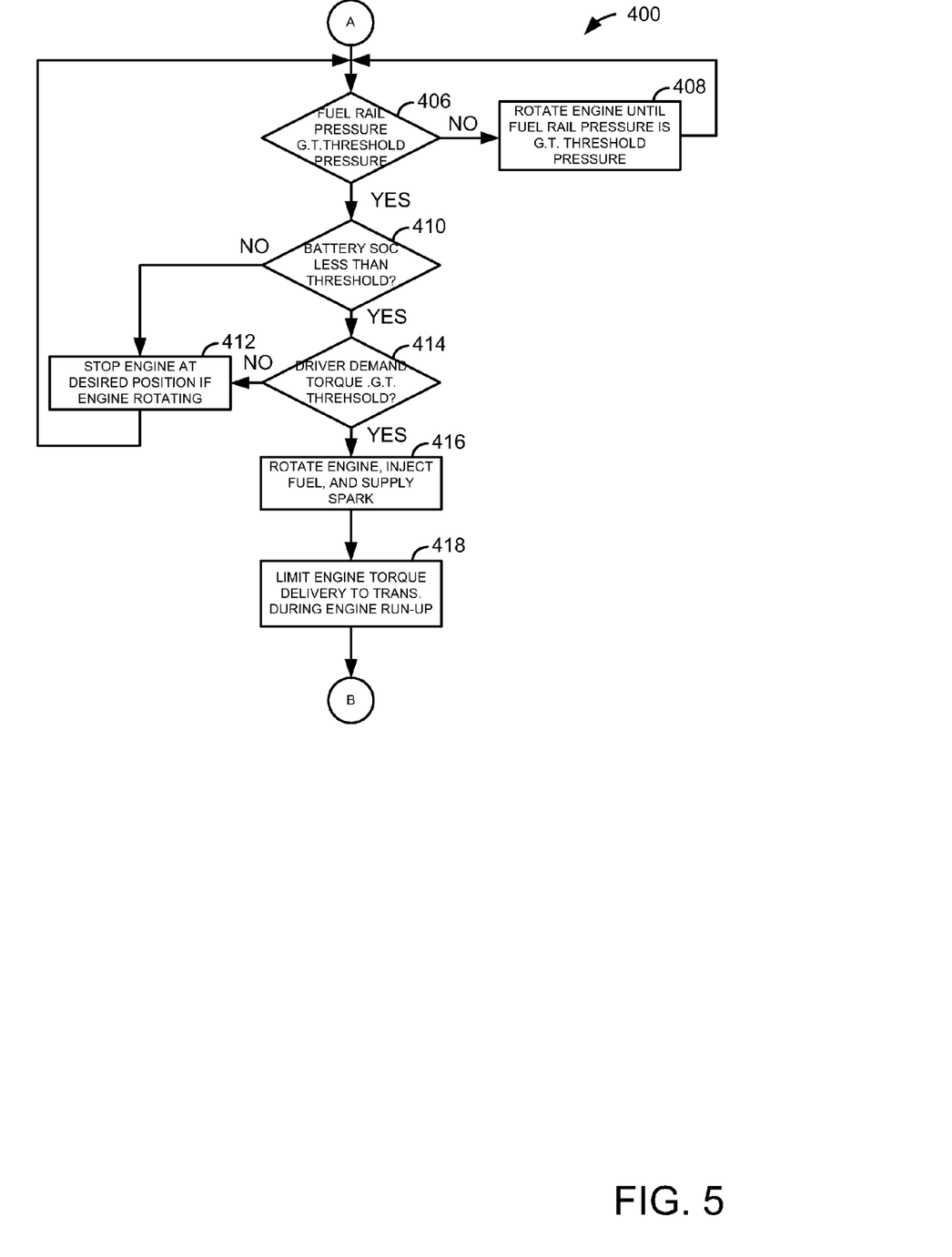

Referring now to FIGS. 4 and 5, a method for starting an engine that includes a driveline disconnect clutch is shown. The method of FIGS. 4 and 5 may be included in the system of FIGS. 1 and 2 as executable instructions stored in non-transitory memory. Further, the method of FIGS. 4 and 5 may provide the operating sequence shown in FIG. 3.

At 402, method 400 begins to stop the internal combustion engine. The engine may begin to be stopped by ceasing to supply fuel and spark to the engine. An engine stop may be initiated via a driver's request or via a controller that requests an engine stop in response to operating conditions other than a driver's input to a device that has a sole purpose of stopping and/or starting the engine (e.g., a key switch). Method 400 proceeds to 404 after the engine is stopped.

At 404, method 400 judges whether or not the engine stop was initiated by a driver's request or a controller's request. In one example, if a driver requests the engine stop, a bit is set in memory. If method 400 judges that the driver requested the engine stop, the answer is yes and method 400 proceeds to 430. Otherwise, the answer is no and method 400 proceeds to 406.

At 406, method 400 judges whether or not fuel pressure in the direct injection fuel rail is greater than a threshold pressure. In one example, the threshold pressure is a pressure greater than a pressure to inject fuel into engine cylinders when the engine is being started (e.g., 10,000 kPa). If method 400 judges that the direct injection fuel rail pressure is greater than a threshold pressure, the answer is yes and method 400 proceeds to 410. Otherwise, the answer is no and method 400 proceeds to 408.

Thus, the engine may be rotated in the absence of a driver activating or applying a device that has a sole purpose of starting and/or stopping the vehicle's engine. Further, the engine may be rotated in the absence of an engine start request by the driver or a controller.

At 408, method 400 rotates the engine until direct injection fuel rail pressure is greater than a threshold pressure. By rotating the engine, the direct injection fuel pump is driven by the engine to supply a predetermined number of fuel pump compression strokes for each engine revolution. A fuel pump compression stroke may be determined from engine position. Alternatively, the engine may be rotated until pressure sensed in the fuel rail is greater than a threshold pressure. The engine is rotated by the DISG. The driveline disconnect clutch is closed or partially closing and slipping when the DISG is rotating the engine. Additionally, method 400 may activate a lower pressure electric pump that supplies fuel to the direct injection higher pressure mechanically driven fuel pump.

The engine is not supplied with spark or fuel while the engine is rotating. In some examples, the engine may be rotated for only a predetermined number of turns or compression strokes of the fuel injection pump. The direct injection engine driven fuel pump may be rotated a predetermined number of revolutions or fuel pump compression strokes instead of rotating the engine until a specified fuel pressure is measured at a fuel pressure sensor. In this way, it may be possible to increase fuel rail pressure without having to have fuel rail pressure feedback. Method 400 rotates the engine until a desired pressure in the direct injection fuel rail is observed or until a desired number of fuel pump compression strokes are reached. Thus, engine rotation may be stopped when pressure in the fuel rail is increased to a level greater than the threshold pressure. Further, the engine may be rotated between engine stops without supplying fuel to the engine. Method 400 returns to 406 after engine rotation begins.

At 410, method 400 judges whether or not battery state of charge (SOC) is less than a threshold SOC. In one example, the battery SOC may be thirty percent of full charge. If method 400 judges that battery SOC is less than a threshold SOC, the answer is yes and method 400 proceeds to 414. Otherwise, the answer is no and method 400 proceeds to 412.

At 412, method 400 stops the engine at a desired position that may reduce engine starting time and emissions. In one example, the engine may be stopped with a cylinder that is within a predetermined number of crankshaft degrees of the cylinder's top dead center compression stroke. Method 400 may control the engine stopping position by adjusting the time that spark and fuel delivery to the engine is ceased. Additionally, the driveline disconnect clutch may be slipped to control the engine stopping position. For example, if the engine is decelerating faster than desired, the driveline disconnect clutch may be partially closed so that DISG torque is provided to the engine so that the engine's deceleration rate is reduced and so that the engine stops at or near the desired engine stopping position. Method 400 returns to 406 after the engine is stopped at the desired position.

At 414, method 400 judges whether or not driver demand torque is greater than a threshold torque. Driver demand torque is a wheel torque requested by a driver. Alternatively, the driver demand torque may be another torque at a location in the vehicle driveline (e.g., transmission input torque). In one example, the threshold torque is a percentage of an amount of torque that may be provided by the DISG. For example, if the DISG has capacity to output 150 N-m of torque, the threshold torque may be 112.5 or 75% of the DISG's torque capacity. If method 400 judges that driver demand torque is greater than the threshold torque, the answer is yes and method 400 proceeds to 416. Otherwise, the answer is no and method 400 proceeds to 412.

At 416, method 400 rotates the engine via partially closing (e.g., slipping) the driveline disconnect clutch. The engine is rotated at a speed less than engine idle speed and spark and fuel are supplied to the engine as the engine rotates. Method 400 proceeds to 418 after the engine begins to rotate.

At 418, method 400 limits engine torque supplied to the transmission input shaft during engine run-up (e.g., the time from beginning to supply spark and fuel to the engine until the engine reaches idle speed). In one example, engine torque may be limited via adjusting spark timing, and/or fuel amount, and/or air inducted to the engine. Method 400 proceeds to exit after engine torque is limited.

At 430, method 400 judges whether or not vehicle activation is requested. A vehicle activation request may be made by a driver activating a key switch or entering within a predetermined proximity of the vehicle or entering within a predetermined proximity of the vehicle's cabin. The driver may have a transmitter that sends a signal to the engine controller when the driver approaches the vehicle or enters the vehicle's cabin, thereby requesting vehicle activation. If method 400 judges that vehicle activation is requested, the answer is yes and method 400 proceeds to 434. Otherwise, the answer is no and method 400 proceeds to 432.

It should be noted that a vehicle activation request is not an engine start request since the driver does not specifically request that the vehicle's engine start. In some examples, the driver may not have the capacity to specifically request an engine start via a key switch or other device. An engine start request is not present or a condition at 430.

At 432, method 400 stops the engine at a desired position that may reduce engine starting time and emissions. In one example, the engine may be stopped with a cylinder that is within a predetermined number of crankshaft degrees of the cylinder's top dead center compression stroke. Method 400 may control the engine stopping position by adjusting the time that spark and fuel delivery to the engine is ceased. Additionally, the driveline disconnect clutch may be slipped to control the engine stopping position. Method 400 exits after the engine is stopped at the desired position.

At 434, method 400 judges whether or not the transmission is in park or neutral. Method 400 may judge a position of a gear selector switch to determine if the vehicle is in park or neutral. If method 400 judges that the transmission is in park or neutral, the answer is yes and method 400 proceeds to 438. Otherwise, the answer is no and method 400 proceeds to 436.

At 436, method 400 notifies the driver that the vehicle is in a gear other than park or neutral. The driver may be notified via an illuminated light or an audible warning. Further, method 400 may limit engine torque provided to the transmission. In one example, the engine may not be started until the driver shifts into park or neutral. Method 400 proceeds to exit after the driver is notified that the vehicle is not in park or neutral.

At 438, method 400 judges whether or not fuel pressure in the direct injection fuel rail is greater than a threshold pressure. In one example, the threshold pressure is a pressure greater than a pressure to inject fuel into engine cylinders when the engine is being started (e.g., 10,000 kPa). If method 400 judges that the direct injection fuel rail pressure is greater than a threshold pressure, the answer is yes and method 400 proceeds to 444. Otherwise, the answer is no and method 400 proceeds to 440.

At 440, method 400 rotates the engine until direct injection fuel rail pressure is greater than a threshold pressure. By rotating the engine, the direct injection fuel pump is driven by the engine to supply a predetermined number of fuel pump compression strokes for each engine revolution. The engine is rotated by the DISG. The driveline disconnect clutch is closed or partially closing and slipping when the DISG is rotating the engine. Additionally, method 400 may activate a lower pressure electric pump that supplies fuel to the direct injection higher pressure mechanically driven fuel pump. The engine is not supplied with spark or fuel while the engine is rotating. In some examples, the engine may be rotated for only a predetermined number of turns or compression strokes of the fuel injection pump. The direct injection engine driven fuel pump may be rotated a predetermined number of revolutions or fuel pump compression strokes instead of rotating the engine until a specified fuel pressure is measured at a fuel pressure sensor. In this way, it may be possible to increase fuel rail pressure without having to monitor a fuel rail pressure sensor. Method 400 rotates the engine until a desired pressure in the direct injection fuel rail is observed or until a desired number of fuel pump compression strokes are reached. Method 400 proceeds to 442 after engine rotation begins.

It should be noted that method 400 rotates the engine at 440 in the absence of an engine start request by the driver or a controller. The engine is rotated to increase pressure within the direct injection fuel rail. Further, engine rotation may be stopped when pressure in the fuel rail is increased to a level greater than the threshold pressure.

At 442, method 400 determines engine position via synchronization of cam and crankshaft position signals. For example, method 400 may determine that the engine is at top-dead-center compression stroke of cylinder number one based on sensing a pulse from the cam and a pulse from the crankshaft. Method 400 proceeds to 444 after engine position is determined.

At 444, method 400 judges whether or not battery state of charge (SOC) is less than a threshold SOC. In one example, the battery SOC may be thirty percent of full charge. If method 400 judges that battery SOC is less than a threshold SOC, the answer is yes and method 400 proceeds to 446. Otherwise, the answer is no and method 400 proceeds to exit.

At 446, method 400 judges whether or not driver demand torque is greater than a threshold torque. In one example, the threshold torque is a percentage of an amount of torque that may be provided by the DISG. For example, if the DISG has capacity to output 150 N-m of torque, the threshold torque may be 112.5 or 75% of the DISG's torque capacity. If method 400 judges that driver demand torque is greater than the threshold torque, the answer is yes and method 400 proceeds to 450. Otherwise, the answer is no and method 400 proceeds to exit.

At 450, method 400 rotates the engine below idle engine speed and supplies spark and fuel to the engine. Further, the driveline disconnect clutch is closed so that the DISG may provide torque to rotate the engine. The driveline disconnect clutch may be fully closed since the transmission is in park or neutral. The engine accelerates to idle speed after combustion is activated in engine cylinders.

Thus, the method of FIGS. 4 and 5 provides for a method of engine starting, comprising: rotating an engine in response to a vehicle activation request and in the absence of an engine start request; not supplying fuel to the rotating engine; stopping rotation of the rotating engine; and starting rotation of the stopped engine in response to an engine start request. The method includes where the engine rotation is stopped in response to fuel rail pressure greater than a threshold pressure. The method further comprises not supplying spark to the engine.

In some examples, the method further comprises slipping a driveline disconnect clutch while rotating the engine. The method includes where the engine is rotated via torque from a driveline integrated starter generator. The method includes where the vehicle activation request is made via a driver entering a passenger cabin of a vehicle that includes the engine. The method further comprises rotating the engine in further response to a fuel rail pressure being less than a predetermined pressure.

The method of FIGS. 4 and 5 also provides for a method of engine starting, comprising: stopping rotation of an engine in response to an engine stop request; closing a driveline disconnect clutch in response to a vehicle activation request and fuel rail pressure being less than a threshold pressure; rotating the engine with the closed driveline disconnect clutch while not supplying fuel to the engine; and supplying spark and fuel to the engine in response to driver demand torque exceeding a threshold torque. The method further comprises stopping rotation of the engine after rotating the engine with the closed driveline disconnect clutch and before supplying spark and fuel to the engine.

In some examples, the method includes where stopping rotation of the engine is in response to a fuel rail pressure being greater than a threshold pressure. The method includes where the engine is rotated in the absence of an engine start request. The method includes where the engine is rotated via a driveline integrated starter generator. The method further comprises not rotating the engine if a transmission of a vehicle that includes the engine is not in park or neutral and a driver requested stopping rotation of the engine. The method further comprises rotating the engine if a transmission of a vehicle is in a forward gear and the driver has not requested stopping rotation of the engine.

As will be appreciated by one of ordinary skill in the art, method described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method of engine starting, comprising:
    rotating an engine in response to a vehicle activation request and in absence of an engine start request, the engine rotation driving a fuel pump that pressurizes a fuel rail with fuel from a tank;
    not supplying fuel to the rotating engine;
    stopping the rotating engine in response to fuel rail pressure greater than a threshold pressure; and
    starting the stopped engine in response to an engine start request.

2. The method of claim 1, further comprising not supplying spark to the engine.

3. The method of claim 1, further comprising slipping a driveline disconnect clutch while rotating the engine.

4. The method of claim 3, where the engine is rotated via torque from a driveline integrated starter generator.

5. The method of claim 1, further comprising rotating the engine in further response to the fuel rail pressure being less than a predetermined pressure.

6. A method of engine starting, comprising:
    rotating an engine in response to a vehicle activation request and in absence of an engine start request;
    not supplying fuel to the rotating engine;
    stopping the rotating engine; and
    starting the stopped engine in response to an engine start request, where the vehicle activation request is made via a driver entering a passenger cabin of a vehicle that includes the engine.

7. The method of claim 6, where the engine is stopped in response to fuel rail pressure greater than a threshold pressure.

8. The method of claim 6, further comprising not supplying spark to the engine.

9. The method of claim 6, further comprising slipping a driveline disconnect clutch while rotating the engine.

10. The method of claim 9, where the engine is rotated via torque from a driveline integrated starter generator.

11. The method of claim 6, further comprising rotating the engine in further response to a fuel rail pressure being less than a predetermined pressure.

12. A method of engine starting, comprising:
    stopping rotation of an engine in response to an engine stop request;
    closing a driveline disconnect clutch in response to a vehicle activation request and fuel rail pressure being less than a threshold pressure;
    rotating the engine by a motor via the closed driveline disconnect clutch while not supplying fuel to the engine; and
    supplying spark and fuel to the engine in response to driver demand torque exceeding a threshold torque.

13. The method of claim 12, further comprising stopping rotation of the engine after rotating the engine with the closed driveline disconnect clutch and before supplying spark and fuel to the engine.

14. The method of claim 13, where stopping rotation of the engine is in response to the fuel rail pressure being greater than the threshold pressure.

15. The method of claim 12, where the engine is rotated in absence of an engine start request.

16. The method of claim 15, where the engine is rotated via a driveline integrated starter generator.

17. The method of claim 12, further comprising not rotating the engine if a transmission of a vehicle that includes the engine is not in park or neutral and a driver requested stopping rotation of the engine.

18. The method of claim 12, further comprising rotating the engine if a transmission of a vehicle is in a forward gear and a driver has not requested stopping rotation of the engine.

* * * * *